United States Patent [19]
Fischer

[11] 3,785,241
[45] Jan. 15, 1974

[54] EXPANSION ANCHOR
[76] Inventor: Artur Fischer, Altheimer Str. 219, Tumlingen, Germany
[22] Filed: Dec. 3, 1971
[21] Appl. No.: 204,512

[30] Foreign Application Priority Data
Dec. 8, 1970 Germany.................. P 20 60 241.9

[52] U.S. Cl. .................................................. 85/71
[51] Int. Cl. ............................................ F16b 13/04
[58] Field of Search............................ 85/71, 70, 83

[56] References Cited
UNITED STATES PATENTS
| 2,255,650 | 9/1941 | Burke | 85/71 |
| 3,174,387 | 3/1965 | Fischer | 85/71 |
| 2,763,314 | 9/1956 | Gill | 85/70 |
| 3,461,771 | 8/1969 | Briles | 85/70 |
| 3,340,761 | 9/1967 | Fischer | 85/83 |

FOREIGN PATENTS OR APPLICATIONS
608,218  9/1948  Great Britain........................ 85/71

Primary Examiner—Edward C. Allen
Attorney—Michael S. Striker

[57] ABSTRACT

An expansion anchor sleeve has a leading portion and a circumferential wall which is circumferentially complete at the leading portion but subdivided into a plurality of longitudinal webs rearwardly of the leading portion. The webs each have two axially adjacent sections the first one of which extends rearwardly from the leading portion and has a greater radial thickness and the second one of which extends rearwardly from the first section and has a lesser radial thickness. At the juncture between the two sections of each web a buckling line is provided and the first portion extends radially outwardly from the longitudinal axis of the sleeve at an acute angle thereto, whereas the second portion extends in substantial parallelism with the longitudinal axis. A screw or similar means is provided for subjecting the sleeve to axial tensile forces to thereby effect radial outward buckling of the two sections of each web with reference to one another.

6 Claims, 4 Drawing Figures

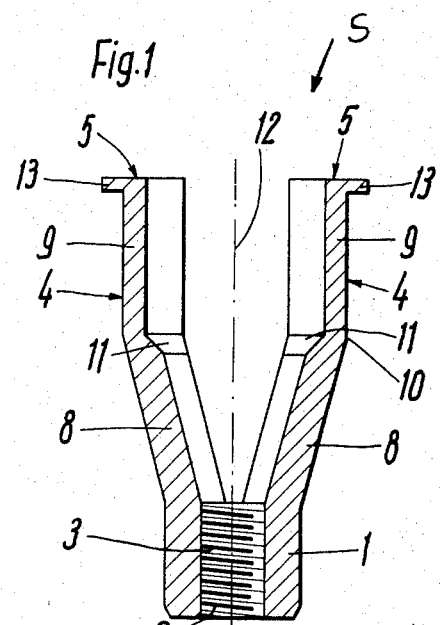
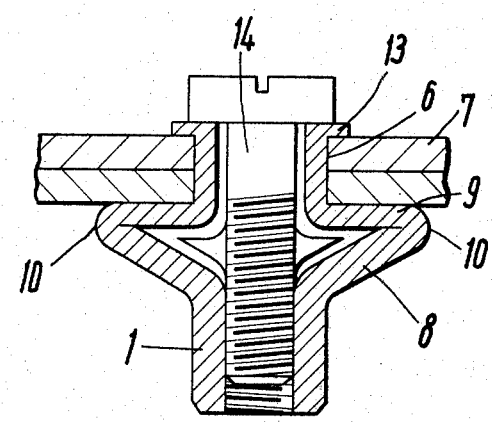
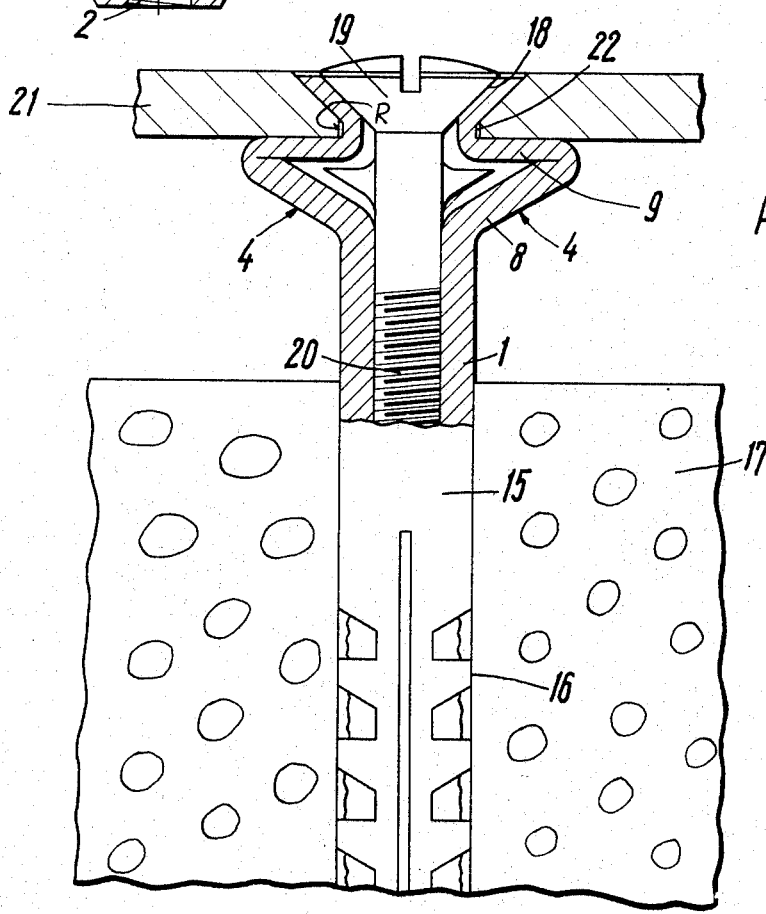

EXPANSION ANCHOR

BACKGROUND OF THE INVENTION

The present invention relates generally to an expansion anchor, and more particularly to an expansion anchor of synthetic plastic material for use in conjunction with hollow walls, thin panels and the like.

Anchors of this type are already known in the art. For instance, the prior art teaches an expansion anchor construction in which a shaft-like hollow portion of the sleeve is provided with six rearwardly extending longitudinal webs which are spaced circumferentially and which have at the trailing end of the sleeve free end portions which are to be accommodated in a bore hole provided in the lowermost of several plates or panels which are superimposed and connected with one another. These webs have a uniform radial thickness over their entire length and it is intended according to the patent that when a screw is threaded into the shaft and tightened, the webs will fold radially and in circumferential direction, to provide at the rear side of the lowermost panel an abutment preventing withdrawal of the sleeve from the hole. Basically, this construction is capable of achieving the intended results; however, experience has shown that the proper radial bending or folding does not always take place, and certainly does not always take place in each and every one of the webs in the desired manner. If the device does not operate perfectly in the intended manner, however, then the abutment formed by those of the webs which do in fact buckle radially is uneven and will not afford as strong a retentive capability as is desirable. A further disadvantage of this possibility is found if the device is extended through a wall board panel, either a panel by itself or a panel forming part of a hollow wall. Such wallboard panels or gypsum panels are manufactured by various producers, for instance by the National Gypsum Corporation under the trade name "Gold Bond" and are used for the erection of dry walls. If the abutment portion is uneven, then it is not uncommon that in the case of such a wallboard panel the abutment portion will destroy the material (gypsum) surrounding the bore hole at the rear or concealed side of the panel when an axial stress is exerted upon the expansion anchor, and the expansion anchor may thus be drawn out of the bore hole, with simultaneous destruction of the material of the panel which surrounds the bore hole. Finally, an additional difficulty which may occur is that one or more of the webs will simply fold over in which case the danger of damage to the material of the panel in the immediate vicinity of the bore hole opening at the concealed side of the panel is increased even further.

SUMMARY OF THE INVENTION

It is a general object of the present invention to overcome the disadvantages of the prior art.

More particularly it is an object of the present invention to provide an improved expansion anchor of the type here under discussion, which is not possessed of these disadvantages.

A further object of the invention is to provide such an improved expansion anchor in which it is assured that the webs thereof will buckle only at a precisely predetermined location and only in radially outward direction.

Another object of the invention is to provide such an expansion anchor wherein at least the expansion anchor sleeve is of synthetic plastic material and wherein, further, the axially directed tensile stresses which must be exerted in order to obtain the buckling of the webs is as low as possible.

The invention meets these objects, and others which will become apparent hereafter by providing, according to one embodiment an expansion anchor which briefly stated comprises an expansion anchor sleeve having a leading portion and a circumferential wall which is circumferentially complete in the region of the leading portion and circumferentially subdivided into a plurality of longitudinal webs rearwardly of the leading portion. Each of the webs has a first section of greater radial thickness extending rearwardly from the leading portion at an acute angle to the longitudinal axis of the sleeve and a second section of lesser radial thickness extending rearwardly from the second section in at least substantial parallelism with the longitudinal axis. The first and second sections of each web form a juncture at which the sections are to buckle and fold radially outwardly in response to exertion of axial tensile forces and whereat the greater thickness decreases to the lesser thickness. There is further provided means for exerting such axially directed tensile forces on the sleeve.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawing.

BRIEF DESCRIPTION OF THE DRAWING

FIG. 1 is an axial section illustrating the sleeve of one embodiment of the invention prior to radial buckling of the webs;

FIG. 2 illustrates the embodiment of FIG. 1 in mounted condition, with the mounting operation partly completed;

FIG. 3 is an axial section illustrating a further embodiment of the invention.

DESCRIPTION OF THE PREFERRED EMBODIMENTS

Figure 4:
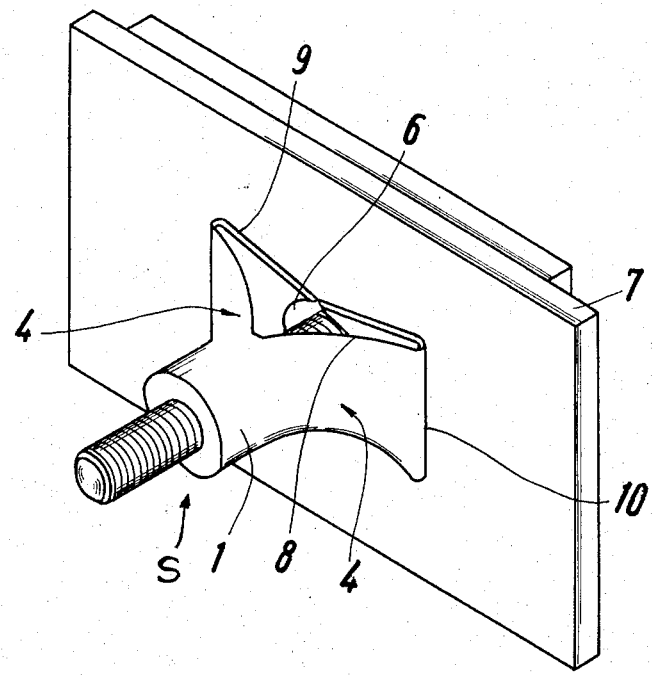
FIG. 4 is a perspective view illustrating an embodiment of the invention in assembled condition.

Discussing firstly the embodiment in FIGS. 1 and 2, it will be seen that here the expansion anchor utilizes an expansion anchor sleeve S which preferably is of synthetic plastic material. It has the leading portion or shaft 1 provided with a central passage 2 which has an internal thread 3. Extending rearwardly from the portion 1 is a plurality of webs 4 having free ends 5 which in operation of the anchor, are to become lodged in the bore hole 6 of one or several superimposed plates or panels 7, as clearly shown in FIG. 2.

In accordance with the present invention the radial thickness of the webs 4 decreases from a greater radial width of the section 8 of each web 4 to a lesser radial width of the associated section 9 of the same web 4. At the juncture between each section 8 and 9 of a web 4, that is the location where buckling is subsequently to take place and which is identified with reference numeral 10 (compare especially FIG. 2), the inner side of each of the webs 4 is provided with a step 11 which in the illustrated embodiment is tapered, that is decreases gradually at the step 11.

It is to be noted that the sections 8 extend rearwardly away from the portion 1 at an acute angle outwardly from the longitudinal axis 12 of the sleeve S to the juncture 10; from the juncture 10 the sections 9 extend in substantial parallelism with the axis 12 and are provided at their rear free ends with radially outwardly directed flange portions 13 which contact the outer surface of the plate or panel in which the device is to be anchored, or of the outermost plate or panel 7 as shown in FIG. 2.

FIG. 2 indicates that when a screw 14 is threaded from the rear end into the portion 1 of the device, the shaft portion 1 is drawn in direction towards the panel or panels 7; as a result of this application of axial tensile forces upon the sleeve the webs 4 will buckle at the junctures 10 and move in radially outward direction with simultaneous axial folding. The sections 9 of lesser thickness will abut in planar orientation against the juxtaposed side of the panel or panels 7, and the thicker sections 8 will become supported by abutment against the sections 9. With this construction (see FIG. 2) the danger of damage to the material of the panel or panels 7, especially in the region surrounding the hole in which the anchor is mounted, is avoided.

It is clear that the location where buckling will occur, that is at the juncture 10, is precisely predetermined and, further, that it is impossible for buckling to occur in any direction other than radially outwardly. Of course, as shown in FIG. 1, before the device is inserted into a hole provided in panel or panels 7, the free ends (which are provided with the flange portions 13) will project slightly radially outwardly beyond the normal diameter of a bore hole in which the device is to be mounted; when the device is subsequently inserted into such a bore hole, the free ends are radially compressed, pivoting about the points or locations 10 which are thus located on a circumferential line the diameter of which is greater than any other diametral distance of the sleeve (with the exception of the flange portions 13). This means that the sections 8 and 9 both are inclined towards the respective point 10 so that absolute assurance exists that buckling in radially outward direction will take place at the points 10.

Upon subsequent expansion as shown in FIG. 2, forces transmitted by the sections 8 will act upon the portion 1 on the one hand, and upon portions of the panel or panels 7 on the other hand which are removed radially outwardly away from the immediate vicinity of the bore hole, so that danger of damage to the material immediately surrounding the bore hole is precluded. In addition, a drawing-in of the webs into the bore hole is also made impossible. All of this results in a low specific load applied to the surface area of the panel in the vicinity of the bore hole, and this is of course of significant advantage if the panel is one of the aforementioned wallboard panels which are highly sensitive to this type of stress.

Because the sections 9 are compressed radially inwardly towards one another when the device is inserted into the bore hole preparatory to expansion, they engage the inner surface of the bore hole with a spring action, and this provides an increased protection against undesired turning of the sleeve S in the bore hole when the screw 14 is threaded into the sleeve.

The sleeve is advantageously made of synthetic plastic material, for instance by injection molding, and the dies required for this purpose can be relatively simple and inexpensive, so that the production of this sleeve is itself highly economical.

The number of webs 4 may vary depending upon particular requirements. In general use, it will be found advantageous to use four of them for a sleeve S. However, in particular if the outer diameter of the sleeve S is small, it is advantageous to provide only two rather than four of the webs 4. They will then have an almost semi-circular shell-shaped cross-section and will of course be considerably wider in circumferential direction of the sleeve S than would be the case if there were four of them. Because of this they are relatively stiff and this in turn permits them to terminate the drawing of the device towards the panel in axial direction, and thereby the radial buckling of the webs at a location or time at which the thicker or greater-thickness sections of the respective webs are still inclined at an acute angle with respect to the longitudinal axis of the sleeve. In this case the axial load acting upon the anchor mounted in a panel or the like, will be supported in a pillar-like manner at the rear side of the panel via the buckling locations 10 which are remote from the bore hole. The requirement of this is that the shaft has been drawn far enough towards the panel so that the web sections having the lesser radial thickness will already be in complete engagement with the panel surface.

FIG. 4 shows such an embodiment which in other respects is the same as the embodiment of FIGS. 1 and 2. In fact, the same reference numerals have been used to designate like components as in FIG. 4 and it will be seen that the only difference is in the fact that the sleeve S is provided with only two rather than four of the webs 4. The greater circumferential width of these two webs is clearly evident. FIG. 4 of course illustrates the device in already-mounted and expanded condition.

It should be pointed out that if the diameter of the expansion anchor sleeve is relatively great, it will be advisable and perhaps even necessary to provide four of the webs, because otherwise the resistance of the webs to buckling would be too great, and as a result too much axial tension would be required to effect such buckling. However, if the outer diameter of the expansion anchor sleeve is relatively large, then it will be appreciated that even if such a sleeve has four rather than only two of the webs 4, the effect (in terms of strength of each web) will be approximately the same as in smaller-diameter sleeves having only two of the webs. Understandably, the flange protions 13 illustrated in FIGS. 1 and 2 need not be provided. However, they are advantageous because it makes it possible to insert the sleeve into a bore hole without previously inserting the screw 14 into the sleeve, at the same time affording protection against the possibility that during subsequent insertion of the screw into the sleeve the latter might be pushed out of the hole and through the panel to the rear thereof.

It is particularly advantageous if the expansion anchor according to the present invention is additionally constructed as a conventional expansion anchor, which may have an elongated sleeve portion extending rearwardly from its leading end. Such an embodiment is illustrated by way of example in FIG. 3 where the same reference numerals have been employed as in the preceding Figures for like elements. In this embodiment the shaft 1 is configured as a known expansion anchor sleeve 15 which is to be anchored in the bore hole 16 of a wall, for instance a masonry wall 17.

It should be noted that here the free ends of the ribs 4, or rather of the sections 19 thereof, are configured so that they can be accommodated to the bevelled head 19 of a screw 20, with the bevel indicated at reference numeral 18. The panel 7 of FIG. 2 is here replaced by a cladding plate 21 which is to be mounted on masonry wall 17 with some spacing therefrom. For this purpose the entire expansion anchor is passed through a bore 22 into the plate 21 into the bore 16 of the wall 17, to such an extent that the cladding plate 21 becomes positioned at a desired distance from the exposed surface of the wall 17, increased by the extent to which the webs 4 can be axially collapsed when they buckle radially. When thereupon the screw 20 is threaded into the shaft 1, the expansion anchor portion 15 is spread radially in the bore 16, anchoring the sleeve in the wall 17. On the other hand the webs 4 again become radially buckled in the manner discussed earlier and also become axially collapsed. As a result of this the sections 9 again abut the concealed side of the panel 21 and the sections 8 provide for the desired retention of the panel 21 against movement with reference to the wall 17.

This embodiment serves primarily, as already indicated, to anchor cladding plates or panels 21 at a certain distance from a surface on which they are to be mounted, for instance from the exposed surface of the wall 17. Of course, the embodiment can also be utilized for other purposes; it has the advantage that it makes it possible to provide for small adjustments of the distance of the panel 21 from the surface of the wall 17 without having to release the anchor which has already been anchored in the hole 16 of the wall 17. When the screw 20 is tightened, the radial buckling of the webs 4 begins as soon as the head 19 of the screw 20 has entered into the recessed bore of the panel 21 and exerts an axial force thereon; further turning of the screw 20 is terminated when the panel is spaced at the desired distance from the wall 17.

FIG. 3 further shows that if desired the outer sides of the webs 4, or at least some of them, can be provided with ribs R which extend over at least part of the length of the webs 4, namely that part which is to be located within the bore hole of a panel or plate. Of course, the ribs R need not be provided, but if provided they serve to provide added assurance against undesired turning of the sleeve when the screw is being tightened. On the other hand they further have the advantage that on insertion of the sleeve through the bore hole they cause the free ends of the webs 4 to be pushed radially inwardly to such an extent that they contact one another in circumferential direction, whereby the sleeve will be tightly retained in a bore hole without freedom of play, even before the screw is inserted and tightened.

It will be understood that each of the elements described above, or two or more together, may also find a useful application in other types of constructions differing from the types described above.

While the invention has been illustrated and described as embodied in an expansion anchor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in particular in the appended claims.

I claim:

1. An expansion anchor, comprising an expansion anchor sleeve having a leading portion, and a circumferential wall which is circumferentially complete in the region of said leading portion and circumferentially subdivided into a plurality of longitudinal webs rearwardly of said leading portion, said webs each being of part-circular cross-section and each including a first section of a substantially constant radial thickness extending rearwardly from said leading portion at an acute angle to the longitudinal axis of said sleeve, and a second section of a substantially constant lesser radial thickness than said first section extending rearwardly from said first section in at least substantial parallelism with said longitudinal axis, said first and second sections of each web forming an abrupt juncture at which said sections are to buckle and fold radially outwardly in response to exertion of axial compressive forces and at which said thickness of said first section decreases to said lesser thickness of said second section, and each of said second sections having an end portion rearwardly spaced from said juncture and which is free of connection with the respective end portions of the other ones of said second sections; and means for engaging said leading portion and for exerting axially directed compressive forces on said sleeve.

2. An expansion anchor as defined in claim 1, wherein said sleeve is of synthetic plastic material.

3. An expansion anchor as defined in claim 1, wherein the radial thickness of each web tapers at said juncture from said greater to said lesser thickness.

4. An expansion anchor as defined in claim 1, said sleeve further comprising a forward portion forwardly of said leading portion and composed of at least two elongated expansible jaws adapted to be radially expanded.

5. An expansion anchor as defined in claim 1, wherein each of said end portions is provided with a flange portion extending in direction radially outwardly of said sleeve.

6. An expansion anchor as defined in claim 1; further comprising ribs provided on the outer side of said webs over at least a protion of the length of the latter.

* * * * *